(12) United States Patent
Resconi

(10) Patent No.: US 7,619,051 B2
(45) Date of Patent: Nov. 17, 2009

(54) BUTENE-1/ETHYLENE COPOLYMER

(75) Inventor: Luigi Resconi, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 423 days.

(21) Appl. No.: 11/376,409

(22) Filed: Mar. 15, 2006

(65) Prior Publication Data

US 2008/0171840 A1    Jul. 17, 2008

Related U.S. Application Data

(62) Division of application No. 10/479,328, filed as application No. PCT/EP02/06575 on Jun. 11, 2002, now Pat. No. 7,074,864.

(30) Foreign Application Priority Data

Jun. 12, 2001  (EP)  ................................. 01202263

(51) Int. Cl.
*C08F 210/08* (2006.01)
*C08F 210/02* (2006.01)
*C08F 4/642* (2006.01)
*C08F 4/6592* (2006.01)

(52) U.S. Cl. .................... 526/348.6; 526/126; 526/160; 526/165; 526/943

(58) Field of Classification Search .............. 526/348.6, 526/160, 165, 126, 943
See application file for complete search history.

(56) References Cited

U.S. PATENT DOCUMENTS

| | | | |
|---|---|---|---|
| 5,145,819 A | 9/1992 | Winter et al. | |
| 5,276,208 A | 1/1994 | Winter et al. | |
| 5,532,396 A | 7/1996 | Winter et al. | |
| 5,576,260 A | 11/1996 | Winter et al. | |
| 5,612,428 A | 3/1997 | Winter et al. | |
| 5,696,045 A | 12/1997 | Winter et al. | |
| 5,698,487 A | 12/1997 | Sacchetti et al. | |
| 5,700,886 A | 12/1997 | Winter et al. | |
| 5,786,432 A | 7/1998 | Kuber et al. | ................. 526/127 |
| 6,150,481 A | 11/2000 | Winter et al. | |
| 6,191,294 B1 | 2/2001 | Resconi et al. | |
| RE37,384 E | 9/2001 | Winter et al. | |
| 6,399,533 B2 | 6/2002 | Sacchetti et al. | |
| 6,444,833 B1 | 9/2002 | Ewen et al. | .................... 556/11 |
| 6,448,350 B1 | 9/2002 | Dall'Occo et al. | |
| 6,469,114 B1 | 10/2002 | Schottek et al. | |
| 6,482,902 B1 | 11/2002 | Bohnen | ...................... 526/127 |
| 6,492,539 B1 | 12/2002 | Bingel et al. | ................... 556/11 |
| 6,627,764 B1 | 9/2003 | Schottek et al. | |
| 6,635,779 B1 | 10/2003 | Ewen et al. | .................... 556/11 |
| 6,930,190 B2 | 8/2005 | Nifant'ev et al. | |
| 6,949,614 B1 | 9/2005 | Schottek et al. | |
| 6,953,829 B2 | 10/2005 | Kratzer et al. | |
| 6,987,196 B2 | 1/2006 | Resconi et al. | |
| 7,074,864 B2 | 7/2006 | Resconi | |
| 7,101,940 B2 | 9/2006 | Schottek et al. | |
| 7,115,761 B2 | 10/2006 | Resconi et al. | |
| 7,141,637 B2 | 11/2006 | Elder et al. | |
| 7,241,903 B2 | 7/2007 | Fritze et al. | |
| 2003/0013913 A1 | 1/2003 | Schottek et al. | |
| 2003/0149199 A1 | 8/2003 | Schottek et al. | |
| 2004/0132612 A1 | 7/2004 | Resconi et al. | |
| 2004/0192931 A1 | 9/2004 | Nifant'ev et al. | |
| 2004/0242815 A1 | 12/2004 | Resconi et al. | |
| 2004/0254315 A1 | 12/2004 | Resconi | |
| 2005/0192418 A1 | 9/2005 | Ewen et al. | |
| 2005/0222349 A1 | 10/2005 | Fait et al. | |
| 2005/0234204 A1 | 10/2005 | Resconi et al. | |
| 2006/0020096 A1 | 1/2006 | Schottek et al. | |

FOREIGN PATENT DOCUMENTS

| | | |
|---|---|---|
| DE | 19903306 | 8/2000 |
| DE | 19917985 | 10/2000 |
| DE | 19962814 | 6/2001 |
| DE | 19962910 | 7/2001 |
| EP | 129368 | 12/1984 |
| EP | 353318 | 8/1988 |
| EP | 172961 | 10/1988 |
| EP | 633272 | 1/1995 |
| EP | 697418 | 2/1996 |
| EP | 775707 | 5/1997 |
| EP | 846696 | 6/1998 |
| EP | 1308466 | 5/2003 |
| JP | 60/262804 | 12/1985 |
| JP | 03/126704 | 5/1991 |
| WO | 91/02012 | 2/1991 |
| WO | 92/00333 | 1/1992 |
| WO | 95/32995 | 12/1995 |
| WO | 98/22486 | 5/1998 |
| WO | 99/21899 | 5/1999 |
| WO | 99/36427 | 7/1999 |
| WO | 99/45043 | 9/1999 |
| WO | 01/21674 | 3/2001 |
| WO | 01/44318 | 6/2001 |
| WO | 01/48034 | 7/2001 |
| WO | 01/62764 | 8/2001 |
| WO | 02/083699 | 10/2002 |
| WO | 99/40129 | 11/2002 |
| WO | 02/100908 | 12/2002 |

(Continued)

OTHER PUBLICATIONS

J. Ewen et al., "Chiral *Ansa* Metallocenes with Cp Ring-Fused to Thiophenes and Pyrroles: Syntheses, Crystal Structures, and Isotactic Polypropylene Catalysts," *J. Am. Chem. Soc.*, vol. 123(20), p. 4763-4773 (2001) XP-002233282.

(Continued)

*Primary Examiner*—Caixia Lu
(74) *Attorney, Agent, or Firm*—William R Reid

(57) ABSTRACT

A 1-butene/ethylene copolymer having a content of ethylene derived units from 0.1% to 5% by weight in which an ethylene content in the polymer ($C_2$) and a melting point of the polymer (Tm) meet the following relation:

$$Tm < -0.3283 C_2^3 + 4.7184 C_2^2 - 22.454 C_2 + 114.$$

3 Claims, No Drawings

FOREIGN PATENT DOCUMENTS

| | | |
|---|---|---|
| WO | 02/100909 | 12/2002 |
| WO | 03/014107 | 2/2003 |
| WO | 02/02659 | 5/2003 |
| WO | 03/045964 | 6/2003 |
| WO | 03/070778 | 8/2003 |

OTHER PUBLICATIONS

Albert Rossi "End Groups in 1-Butene Polymerization via Methylaluminoxane and Zirconocene Catalyst", Macromolecules, *American Chemical Society* (1995) pp. 1739-1749.

N. Naga, K. Mizunuma, Effect of co-catalyst system on a-olefin polymerization with rac-and meso-[dimethylsilylenebis(2,3,5-trimethyl-cyclopentadienyll]zirconium dichloride, Macromol. Rapid Commun,18, pp. 581-589 (1997).

V. Busico, "Regiospecificity of 1-butene polymerization catalyzed by $C_2$-symmetric group IV metallocenes," Macromol. Rapid Commun, pp. 269-274, (1995).

C. J. Carman et al., "Monomer Sequence Distribution in Ethylene-Propylene Rubber Measured by $^{13}$C NMR. 3. Use of Reaction Probability Model," *Macromolecules*, vol. 10(3), p. 536-544 (1977).

BUTENE-1/ETHYLENE COPOLYMER

CROSS-REFERENCE TO RELATED APPLICATIONS

This application is a divisional of application Ser. No. 10/479,328, filed Dec. 2, 2003 now U.S. Pat. No. 7,074,864, which is a national phase filing under 35 U.S.C. §371 of International Patent Application No. PCT/EP02/06575, filed on Jun. 11, 2002, which claims priority to European Patent Application 01202263.8 filed on Jun. 12, 2001. The entire contents of application Ser. No. 10/479,328, International Patent Application No. PCT/EP02/06575 and European Patent Application 01202263.8, each as filed, are incorporated herein by reference.

The present invention relates to a process for polymerizing 1-butene by using a substituted bis cyclopentadienyl bridged metallocene compound. 1-butene polymers are well known in the art. In view of their good properties in terms of pressure resistance, creep resistance, and impact strength they have a lot of uses such as the manufacture of pipes to be used in the metal pipe replacement, easy-open packaging and films. The 1-butene (co)polymers are generally prepared by polymerizing 1-butene in the presence of $TiCl_3$ based catalysts components together with diethylaluminum chloride (DEAC) as cocatalyst. In some cases diethyl aluminum iodide (DEAI) is also used in mixtures with DEAC. The polymers obtained, however, generally do not show satisfactory mechanical properties. Furthermore, in view of the low yields obtainable with the $TiCl_3$ based catalysts, the 1-butene polymers prepared with these catalysts have a high content of catalyst residues (generally more than 300 ppm of Ti) which lowers the properties of the polymers making it necessary a deashing step. 1-butene (co)polymers can also be obtained by polymerizing the monomers in the presence of a stereospecific catalyst comprising (A) a solid component comprising a Ti compound and an electron-donor compound supported on $MgCl_2$; (B) an alkylaluminum compound and, optionally, (C) an external electron-donor compound. A process of this type is disclosed in EP-A-172961 and more recently in WO99/45043. In Macromolecules 1995, 28, 1739-1749 rac-dimethylsilylbis(4,5,6,7-tetrahydro-1-indenyl)zirconium dichloride and methylaluminoxane have been used for polymerizing 1-butene, even if the yield of the process is not indicated the molecular weight of the polymer (Mn) is very low. Recently metallocene compounds have been used for producing 1-butene polymers. In Macromol. Rapid Commun. 18, 581-589 (1997) rac and meso-[dimethylsilylenebis(2,3,5-trimethyl-cyclopentadienyl)]zirconium dichloride have been used for the polymerization of 1-butene, the yields of the process and the molecular weight of the obtained polymers are rather low. More recently in Macromolecules 2000, 33, 1955-1956 $Me_2Si(2-Me-4,5-BzoInd)_2ZrCl_2$, $Me_2Si(2-Me-4-PhInd)_2ZrCl_2$ and $Me_2Si(Ind)_2ZrCl_2$ have been tested in the polymerization of 1-butene. Even if the molecular weights of the polymers appear to be quite high, the activities of these catalysts are low as shown in the comparative examples of the present application. A new process that permits to obtain 1-butene polymer with high molecular weight and in high yield is therefore desirable. An object of the present invention is a process for polymerizing 1-butene comprising the step of contacting under polymerization conditions 1-butene and optionally from 0 to 20% by mol, preferably from 0 to 10% by mol of ethylene, propylene and/or an alpha olefin of formula $CH_2=CHZ$ wherein Z is a $C_3-C_{10}$ alkyl group, in the presence of a catalyst system obtainable by contacting:

a) a racemic or racemic-like bridged metallocene compound of formula (I)

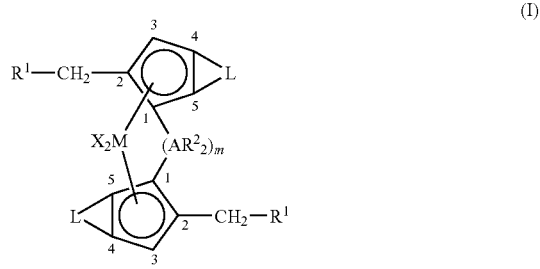

(I)

wherein $R^1$, same or different, is hydrogen, a linear or branched saturated or unsaturated $C_1-C_{20}$-alkyl, $C_3-C_{20}$-cycloalkyl, $C_6-C_{20}$-aryl, $C_7-C_{20}$-alkylaryl, $C_7-C_{20}$-arylalkyl radical, optionally containing heteroatoms belonging to groups 13-17 of the Periodic Table of the Elements; preferably $R^1$ is hydrogen or a $C_1-C_{20}$-alkyl radical, more preferably $R^1$ is hydrogen or methyl.

A, same or different, is a carbon atom, a germanium atom or a silicon atom; with the proviso that, when m is 1, A is different from a carbon atom; preferably A is a silicon atom;

m is 1 or 2, preferably m is 1;

$R^2$, same or different, is hydrogen, or a linear or branched saturated or unsaturated $C_1-C_{20}$-alkyl, $C_3-C_{20}$-cycloalkyl, $C_6-C_{20}$-aryl, $C_7-C_{20}$-alkylaryl, $C_7-C_{20}$-arylalkyl radical, optionally containing heteroatoms belonging to groups 13-17 of the Periodic Table of the Elements; preferably $R^2$ is hydrogen, a $C_1-C_{20}$-alkyl or a $C_6-C_{20}$-aryl; more preferably $R^2$ is hydrogen, methyl or phenyl;

more preferably the bridge $(R^2_2A)_m$ is $Si(CH_3)_2$, $SiPh_2$, $CH_2CH_2$;

M is a transition metal atom selected from those belonging to group 4 of the Periodic Table of the Elements (IUPAC version); preferably M is zirconium or hafnium, more preferably M is zirconium;

X, same or different, is a hydrogen atom, a halogen atom, or a R, OR, $OSO_2CF_3$, OCOR, SR, $NR_2$ or $PR_2$ group, wherein R is a linear or branched, saturated or unsaturated $C_1-C_{20}$ alkyl, $C_3-C_{20}$ cycloalkyl, $C_6-C_{20}$ aryl, $C_7-C_{20}$ alkylaryl or $C_7-C_{20}$ arylalkyl radical, optionally containing heteroatoms belonging to groups 13-17 of the Periodic Table of the Elements; or two X can optionally form a substituted or unsubstituted butadienyl radical or a $OR^{11}O$ group wherein $R^{11}$ is a divalent radical selected from $C_1-C_{20}$ alkylidene, $C_6-C_{40}$ arylidene, $C_7-C_{40}$ alkylarylidene and $C_7-C_{40}$ arylalkylidene radicals; preferably X is a hydrogen atom, a halogen atom or a R group; more preferably X is chlorine or a methyl radical;

wherein the R substituents are selected from linear or branched, saturated or unsaturated $C_1-C_{20}$-alkyl, $C_3-C_{20}$-cycloalkyl, $C_6-C_{20}$-aryl, $C_7-C_{20}$-alkylaryl, $C_7-C_{20}$-arylalkyl radical, optionally containing heteroatoms belonging to groups 13 or 15-17 of the Periodic Table of the Elements; preferably X is hydrogen, a halogen atom, a R or OR group; more preferably X is hydrogen, chlorine or methyl;

L, same or different, is a moiety of formula (Ia), (IIb), or (IIc):

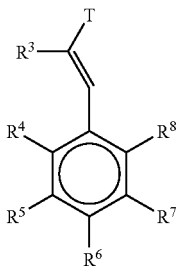 (IIa)

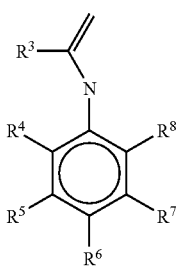 (IIb)

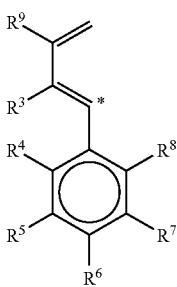 (IIc)

wherein
in the moiety of formula (IIa) T bonds to the cyclopentadienyl group in position 5;
in the moiety of formula (IIb) N bonds to the cyclopentadienyl group in position 4;
in the moiety of formula (IIc) the carbon atom marked with the symbol * bonds to the cyclopentadienyl group in position 4;
T is an oxygen (O) atom, a sulphur (S) atom or a $CH_2$ group; preferably T is sulphur;
$R^3$ is hydrogen or a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;
$R^4$ is a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;
preferably, $R^3$ is hydrogen or a $C_1$-$C_{20}$-alkyl radical; more preferably $R^3$ is methyl;
preferably, $R^4$ is a $C_1$-$C_{20}$-alkyl radical; more preferably $R^4$ is methyl;

$R^5$, $R^6$, $R^7$, $R^8$ and $R^9$, same or different, are selected from the group consisting of hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements, or two adjacent groups can form together a saturated or unsaturated condensed 5 or 6 membered ring optionally containing heteroatoms belonging to groups 13-16 of the Periodic Table of the Elements; Preferably $R^7$ is hydrogen or methyl; preferably $R^5$, $R^6$, $R^8$ and $R^9$ are hydrogen.

b) an alumoxane or a compound able to form an alkylmetallocene cation; and c) optionally an organo aluminum compound.

Preferred structures for the $(R^2{}_2A)_m$ bridging group are $Si(CH_3)_2$, $SiPh_2$, $CH_2CH_2$, the $Si(CH_3)_2$ being the most preferred.

Non limitative examples of compound of formula (I) are:

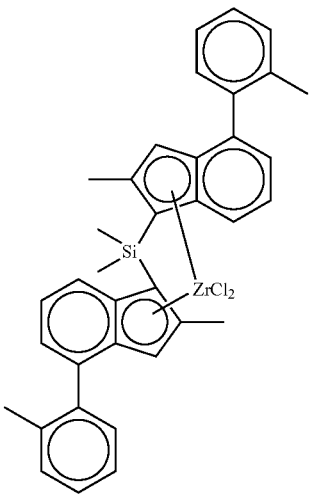

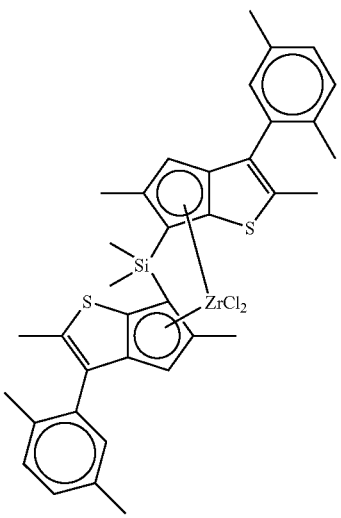

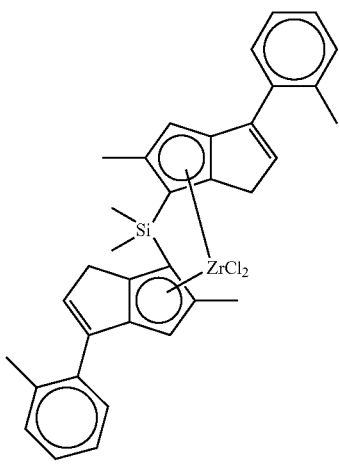

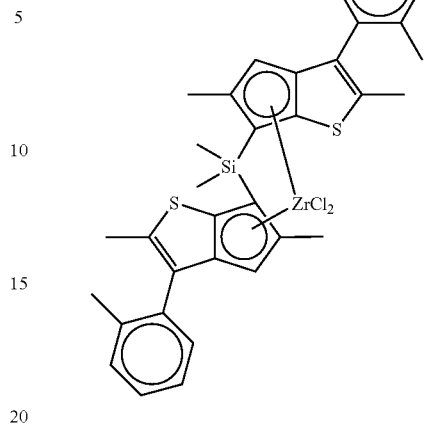

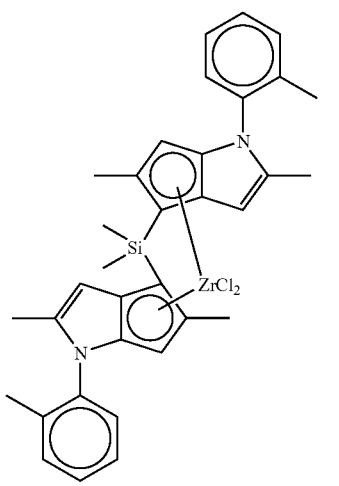

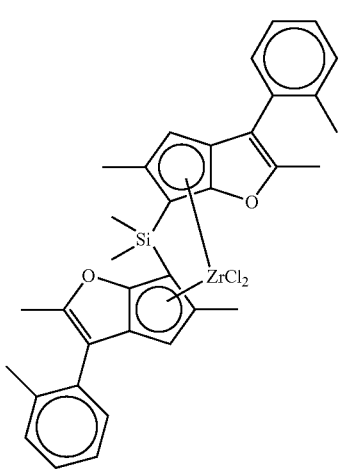

as well as the corresponding dihydride and dimethyl compounds.

Preferably the compounds of formula (I) have formula (III):

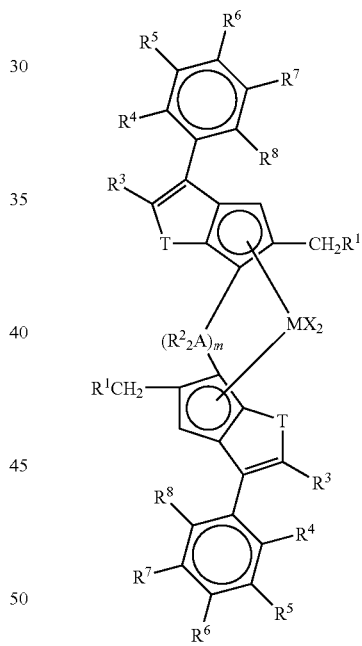

(III)

wherein $R^1$, $R^2$, $R^3$, $R^4$, $R^5$, $R^6$, $R^7$, $R^8$, A, M, T, X and m are defined as above.

Metallocene compounds of formula (I) or (III) are well known in the art, they can be prepared according to known procedure, such as those described in WO 01/44318 and U.S. Pat. No. 5,786,432. Alumoxanes used as component b) can be obtained by reacting water with an organo-aluminium compound of formula $H_jAlU_{3-j}$ or $H_jAl_2U_{6-j}$, where U substituents, same or different, are hydrogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene is comprised between about 10:1 and about 20000:1, and more preferably between about 100:1 and about 5000:1.

The alumoxanes used in the catalyst according to the invention are considered to be linear, branched or cyclic compounds containing at least one group of the type:

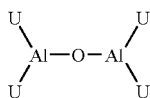

wherein the substituents U, same or different, are described above.

In particular, alumoxanes of the formula:

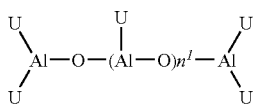

can be used in the case of linear compounds, wherein $n^1$ is 0 or an integer from 1 to 40 and the substituents U are defined as above, or alumoxanes of the formula:

can be used in the case of cyclic compounds, wherein $n^2$ is an integer from 2 to 40 and the U substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in PCT/EP00/09111 in which the alkyl and aryl groups have specific branched patterns. Non-limiting examples of aluminium compounds according to said international applications are:
tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl) aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl) aluminium, tris(2-methyl-3-phenyl-butyl)aluminium, tris (2-ethyl-3-phenyl-butyl)aluminium, tris(2,3-dimethyl-3-phenyl-butyl)aluminium, tris(2-phenyl-propyl) aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl) aluminium, tris(3-methyl-2-phenyl-butyl)aluminium, tris (2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group. Amongst the above aluminium compounds, trimethylaluminium (TMA), triisobutylaluminium (TIBAL), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred. Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAR_3P$ wherein P is a substituted or unsubstituted pyrrol radicals. These compounds are described in PCT/EP01/01467. all these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate, Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate,
N,N-Dimethylaniliniumtetrakis(pentafluorophenyl)borate.

Further compounds that can be used are those of formula RM'—O—M'R, R being an alkyl or aryl group, and M' is selected from an element of the Group 13 of the Periodic Table of the Elements (new IUPAC version). Compounds of this type are described, for example, in the International patent application WO 99/40129. Organic aluminum compounds used as compound c) are those of formula $H_jAlU_{3-j}$ or $H_jAl_2U_{6-j}$ described above. The polymerization process of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane). Preferably the polymerization is carried out in liquid monomer. The polymerization temperature preferably ranges from 0° C. to 250° C.; preferably comprised between 20° C. and 150° C. and, more particularly between 40° C. and 90° C.; The molecular weight distribution of the polymer obtained with the process of the present invention can be varied by using mixtures of different metallocene compounds or mixtures of the metallocene compound of formula (I) and a Ziegler-Natta catalyst or by carrying out the polymerization in several stages at different polymerization temperatures and/or different concentrations of the molecular weight regulators and/or different monomer concentration. The polymerization yield depends on the purity of the transition metal organometallic catalyst compound a) in the catalyst, therefore, said compound can be used as such or can be subjected to purification treatments before use. With the process of the present invention 1-butene can be polymerized with high yields and the isotactic polymers obtained show a high molecular weight and a low content of regioerrors, i.e. 4.1 insertions. Moreover the obtained polymer show very high values of the flexural modulus allowing to obtain pipes having a longer durability and thinner walls. Therefore another object of the present invention is a 1-butene homopolymer having the following characteristics:

intrinsic viscosity (I.V.)>0.7 dL/g; preferably >1 dL/g; more preferably >1.5 dL/g;

isotactic triads (mm)>70%; preferably >95%; more preferably >98%;

a flexural modulus (ASTM D 638)>400 Mpa; preferably >425 MPa; more preferably >450 Mpa;

melting point >105° C., preferably >108° C.; more preferably >110° C.

The 4.1 insertions are lower than <0.90%; preferably the 4.1 insertions are comprised between 0.05% and 0.90%; more preferably they are comprised between 0.10% and 0.70%; a further preferred range is between 0.10% and 0.39%.

Preferably the 1-butene homopolymers of the invention have molecular weight distribution (Mw/Mn)<3; more preferably <2.5; even more preferably <2.2.

When 1-butene is copolymerized with ethylene, propylene or an alpha olefin of formula $CH_2=CHZ$ wherein Z is a $C_3$-$C_{10}$ alkyl group, a copolymer having a comonomer derived units content from 0 to 50% by weight can be obtained. preferably from 0.5 to 20% by weight. Preferred comonomers are ethylene or propylene.

A particular interesting copolymer that can be obtained with the process of the present invention is a 1-butene/ethylene copolymer having a content of ethylene derived units from 0.1% to 5% by weight preferably from 0.5% to 2.5% by weight in which the ethylene content in the polymer ($C_2$) and the melting point of the polymer (Tm) meet the following relation:

$$Tm<-0.3283C_2^3+4.7184C_2^2-22.454C_2+114.$$

Preferably the relation is $Tm<-0.3283C_2^3+4.7184C_2^2-22.454C_2+113$; more preferably $Tm<-0.3283C_2^3+4.7184C_2^2-22.454C_2+111.2$.

When the content of ethylene derived units in the above copolymer ranges from 0.1 to 2.5% by weight the ethylene content in the polymer ($C_2$) and the melting point of the polymer (Tm) meet the following relation:

$$Tm=4.0037C_2^2-21.91C_2+114;$$

preferably the relation is $Tm=4.0037C_2^2-21.91C_2+113$; more preferably $Tm=4.0037C_2^2-21.91C_2+110.5$.

Furthermore the 1-butene/ethylene copolymer above described are endowed with a molecular weight distribution (Mw/Mn)<4.

A further feature of said 1-butene/ethylene copolymer is the intrinsic viscosity (I.V.)>0.7 dL/g; preferably >1 dL/g.

EXPERIMENTAL SECTION

The intrinsic viscosity (I.V.) was measured in tetrahydronaphtalene (THN) at 135° C.

The melting points of the polymers ($T_m$) were measured by Differential Scanning Calorimetry (D.S.C.) on a Perkin Elmer DSC-7 instrument, according to the standard method. A weighted sample (5-10 mg) obtained from the polymerization was sealed into aluminum pans and heated at 180° C. with a scanning speed corresponding to 10° C./minute. The sample was kept at 180° C. for 5 minutes to allow a complete melting of all the crystallites. Successively, after cooling to 20° C. with a scanning speed corresponding to 10° C./minute. After standing 2 minutes at 20° C., the sample was heated for the second time at 180° C. with a scanning speed corresponding to 10° C./min. In this second heating run, the peak temperature was taken as the melting temperature ($T_m$) and the area as global melting enthalpy ($\Delta H_f$).

The molecular weight distribution was determined on a WATERS 150 C using the following chromatographic conditions:

| | |
|---|---|
| Columns: | 3x SHODEX AT 806 MS; 1x SHODEX UT 807; 1x SHODEX AT-G; |
| Solvent: | 1,2,4 trichlorobenzene (+0.025% 2,6-Di-tert.Butyl-4-Methyl-Phenol); |
| Flow rate: | 0.6-1 ml/min; |
| Temperature: | 135° C.; |
| Detector: | INFRARED AT λ ≅ 3.5 μm; |
| Calibration: | Universal Calibration with PS-Standards. |

$^{13}$C-NMR spectra were acquired on a DPX-400 spectrometer operating at 100.61 MHz in the Fourier transform mode at 120° C. The peak of the 2B$_2$ carbon (nomenclature according to Carman, C. J.; Harrington, R. A.; Wilkes, C. E. *Macromolecules* 1977, 10, 535) was used as internal reference at 27.73. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove 1H-13C coupling. About 3000 transients were stored in 32K data points using a spectral window of 6000 Hz. Assignments of 4.1 insertion were made according to Busico (V. Busico, R. Cipullo, A. Borriello, *Macromol. Rapid. Commun.* 1995, 16, 269-274)

| Chemical Shift (ppm) | Carbon | Sequence |
| --- | --- | --- |
| 40.21 | CH$_2$ (S$_{\alpha\alpha}$) | B |
| 39.65 | CH$_2$ | D1 |
| 37.3 | CH | D2 |
| 34.99 | CH | B |
| 34.31 | CH$_2$ | D3 |
| 31.13 | CH$_2$ | D5 |
| 27.73 | CH$_2$ branch | B mmmm |
| 27.57 | CH$_2$ branch | B mmmr |
| 27.37 | CH$_2$ branch | B mmrr |
| 27.21-27.14 | CH$_2$ | D4 + D6 |
| 26.57 | CH$_2$ branch | B mrrm |
| 10.96 | CH$_3$ | B |

The content of 4.1 insertions was calculated as follows: 4.1 units=0.5×I$_4$×100/(I$_2$+I$_4$)

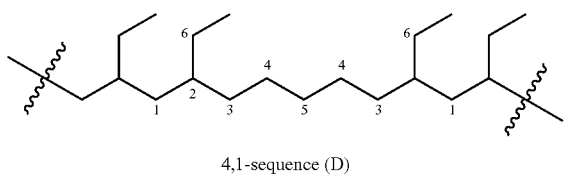

4,1-sequence (D)

Preparation of Catalyst Components

Rac dimethylsilandiylbis-6-[2,5-dimethyl-3-(2'-methylphenyl)cyclopentadienyl-[1,2-b]-thiophene]zirconium dichloride (A-1), rac dimethylsilandiylbis-6-[2,5-dimethyl-3-(2',5'-dimethyl-phenyl)cyclopentadienyl-[1,2-b]-thiophene]zirconium dichloride (A-2) and rac dimethylsilandiylbis-6-(2,5-dimethyl-3-phenylcyclopentadienyl-[1,2-b]-thiophene)zirconium dichloride (A-3) were prepared according to PCT/EP00/12406. Rac dimethylsilylbis(2-methyl-4-phenyl-indenyl) zirconium dichloride (A-4) was prepared according to U.S. Pat. No. 5,786,432. The cocatalyst methylalumoxane (MAO) was a commercial product which was used as received (Witco AG, 10% wt/vol toluene solution, 1.7 M in Al).

Examples 1-4 and Comparative Examples 5-6

1-butene homopolymer

The catalyst mixture was prepared by dissolving the amount of the metallocene indicated in table 1 in 8 ml of toluene (excepting for example 3 in which 3 ml of toluene has been used) with the proper amount of the MAO solution (amounts are reported in table 1), obtaining a solution which was stirred for 10 min at room temperature before being injected into the autoclave. 4 mmol of Al(i-Bu)$_3$ (TIBA) (as a 1 M solution in hexane) and 712 g of 1-butene were charged, at room temperature, in a 2.3-L jacketed stainless-steel autoclave, equipped with magnetically driven stirrer and a 35-mL stainless-steel vial, connected to a thermostat for temperature control. The autoclave was then thermostatted at 2° C. below the polymerization temperature and the catalyst system, prepared as reported above, was injected in the autoclave by means of nitrogen pressure through the stainless-steel vial. The temperature was rapidly raised to the polymerization temperature and the polymerization was carried out at constant temperature, for a time indicated in table 1. After cooling the reactor to room temperature, the polymer was dried under reduced pressure, at 60° C. The polymerization conditions and the characterization data of the obtained polymers are reported in Table 1.

Examples 7-13

1-butene homopolymer

The catalyst mixture was prepared by dissolving the amount of the metallocene indicated in table 2 in 8 ml of toluene with the proper amount of the MAO solution (Al/Zr ratio reported in table 2), obtaining a solution which was stirred for 10 min at room temperature before being injected into the autoclave. A 4.25 litres steel autoclave, equipped with magnetically stirred anchor (usual stirring rate 550 rpm) and with different Flow Record & Control systems (FRC), among which a FRC having maximum flow rate of 9000 gr/hour for 1-butene and two FRC having maximum flow rate of 500 and 30 g/h for ethylene is cleaned with warm nitrogen (1.5 barg N2, 70° C., 1 hour). After the above mentioned autoclave cleaning, the stirring starts and 1-butene is fed into the reactor (1350 gr at 30° C.) together with 6 mmol of Al(i-Bu)$_3$ (TIBA) (as a 1 M solution in hexane). Subsequently, the reactor inner temperature is raised from 30° C. to the polymerisation temperature (indicated in table 2); as a consequence the pressure increases. When pressure and temperature are constant, the catalytic solution is fed into the reactor with a nitrogen overpressure. The polymerisation is run for a time indicated in table 2 at the chosen polymerization temperature. Then the stirring is interrupted; the pressure into the autoclave is raised to 20 bar-g with nitrogen. The bottom discharge valve is opened and the 1-butene/poly-1-butene mixture is discharged into the steel heated tank containing water at 70° C. The tank heating is switched off and a flux of 0.5 bar-g nitrogen is fed. After 1 hour cooling at room temperature the steel tank is opened and the wet polymer collected. The wet polymer is dried in oven under nitrogen at 70° C. The polymerization conditions and the characterization data of the obtained polymers are reported in Table 2.

Characterization of Homopolymer

Samples of polymer obtained from examples 3, 7, 9, and 10 were ground in an electric mill with liquid nitrogen in order to achieve the right size to feed them in a Brabender® mixer chamber. The ground samples were mixed in a Brabender® chamber with 1% 2,6-di-t-butyl-4-methyl phenol (BHT) at 200° C. and then transformed in 1.9 and 4.0 mm thick plaques through compression molding at 200° C.

The 1.9 mm thick plaques were submitted to tensile test (according to ASTM D 638 method), while the 4.0 mm thick plaques were submitted to the flexural modulus determination according to ISO 178 method. The results are reported in table 2a.

Examples 14-19

1-butene/ethylene copolymer

The catalyst mixture was prepared by dissolving the amount of the metallocene indicated in table 2 in toluene with the proper amount of the MAO solution (Al/Zr=10000), obtaining a solution which was stirred for 10 min at room temperature before being injected into the autoclave. A 4.25 litres steel autoclave, equipped with magnetically stirred anchor (usual stirring rate 550 rpm) and with the proper Flow Record & Control systems (FRC), among which a FRC having maximum flow rate of 9000 gr/hour for 1-butene and two FRC having maximum flow rate of 500 and 30 g/h for ethylene is cleaned with warm nitrogen (1.5 barg $N_2$, 70° C., 1 hour). After the above mentioned autoclave cleaning, the stirring starts, 1-butene is fed into the reactor (1350 gr at 30° C. excepting for example 10 wherein 1368 g of 1-butene are used) with the amount of ethylene reported in table 3, together with 6 mmol of Al(i-Bu)$_3$ (TIBA) (as a 1 M solution in hexane). Subsequently, the reactor inner temperature is raised from 30° C. to the polymerisation temperature (indicated in table 3); as a consequence the pressure increases. When pressure and temperature are constant, the catalytic solution is fed into the reactor with a nitrogen overpressure and the polymerisation pressure is kept constant feeding only ethylene (amount indicated in table 3). The polymerisation is run for a time indicated in table 3 at the chosen polymerization temperature. Then the stirring is interrupted; the pressure into the autoclave is raised to 20 bar-g with nitrogen. The bottom discharge valve is opened and the 1-butene/poly-1-butene mixture is discharged into the steel heated tank containing water at 70° C. The tank heating is switched off and a flux of 0.5 bar-g nitrogen is fed. After 1 hour cooling at room temperature the steel tank is opened and the wet polymer collected. The wet polymer is dried in a oven under nitrogen at 70° C. The polymerization conditions and the characterization data of the obtained polymers are reported in Table 3

TABLE 1

| Ex | metall. | Mg | $Al_{(MAO)}/Zr$ | $T_{pol}$ °C. | t (min) | Yield (g) | Activity kg/($g_{cat}$*h) | I.V. (dL/g) | $M_w/M_n$ | regioerrors triads % (mm) | 4,1 insertions | $T_m(II)$ °C. | $\Delta H_f(II)$ J/g |
|---|---|---|---|---|---|---|---|---|---|---|---|---|---|
| 1 | A-1 | 2 | 1000 | 60 | 17 | 73.8 | 130.2 | 1.8 | n.a. | >99 | 0.17% | 110 | 40 |
| 2 | A-1 | 3 | 200 | 60 | 30 | 89.9 | 60.0 | 2.0 | n.a. | ≈100 | 0.3% | n.a. | n.a. |
| 3 | A-2 | 1 | 1000 | 60 | 60 | 69.9 | 69.9 | 1.7 | 2.16 | ≈100 | 0.2% | 111 | 34 |
| 4 | A-2 | 3 | 200 | 70 | 30 | 124.9 | 83.3 | 1.3 | n.a. | n.a. | n.a. | n.a. | n.a. |
| 5* | A-3 | 4 | 1000 | 60 | 30 | 96.5 | 48.3 | 1.0 | 2.12 | ≈100 | 1% | 100 | 37 |
| 6* | A-4 | 4 | 1000 | 60 | 60 | 39.5 | 9.9 | 0.9 | n.a. | ≈100 | 0.4% | 105 | 33 |

*comparative
n.a. = not available

TABLE 2

| Ex | Metall. | Mg | $Al_{(MAO)}/Zr$ | $T_{pol}$ | t (min) | Yield (g) | Activity Kg/($g_{cat}$*h) | I.V. (dL/g) | $M_w/M_n$ | $T_m(II)$ °C. | $\Delta H_f(II)$ J/g |
|---|---|---|---|---|---|---|---|---|---|---|---|
| 7 | A-2 | 3 | 1000 | 50 | 43 | 263 | 122.3 | 2.31 | 2.09 | 111.6 | 36.0 |
| 8 | A-2 | 1 | 1000 | 70 | 60 | 130 | 130.0 | 1.50 | 2.18 | 109.2 | 35.4 |
| 9 | A-2 | 1 | 1000 | 85 | 60 | 195 | 195.0 | n.a. | 2.12 | n.a. | n.a. |
| 10 | A-1 | 3 | 1000 | 50 | 53 | 285 | 107.5 | 2.72 | 2.14 | 110.2 | 34.9 |
| 11 | A-1 | 2 | 1000 | 85 | 60 | 90 | 45.0 | n.a. | 2.12 | n.a. | n.a. |
| 12 | A-1 | 2 | 1000 | 85 | 60 | 312.4 | 156.2 | n.a. | 2.18 | n.a. | n.a. |
| 13 | A-1 | 2 | 500 | 85 | 60 | 166 | 83.0 | n.a. | 2.16 | n.a. | n.a. |

TABLE 2a

| Ex | Flexural modulus (MPa) | Yield strength (MPa) | Break strength (MPa) | Elongation at break (%) |
|----|---|---|---|---|
| 3 | 480 | n.a. | n.a. | n.a. |
| 7 | 472 | 19.2 | 40.0 | 300 |
| 9 | 472 | 23.8 | 22.8 | 218 |
| 10 | 437 | 18.6 | 37.9 | 280 | n.a. = not available

TABLE 3

| Ex | met. | mg | $T_{pol}$ °C. | t (min) | $C_2$ added g | $C_2$ feed g | Yield (g) | Activity kg/($g_{cat}$*h) | I.V. | $C_2$ wt% (IR) | $M_w/M_n$ | $T_m$(II) °C. |
|----|------|----|------|-----|------|------|------|------|------|------|------|------|
| 14 | A-1 | 1 | 70 | 70 | 0.9 | 4 | 224.0 | 192.0 | 1.22 | 0.50 | 2.41 | 99.56 |
| 15 | A-1 | 1 | 70 | 70 | 0.8 | 6 | 127.0 | 108.9 | 1.26 | 0.50 | 2.40 | 99.72 |
| 16 | A-1 | 1 | 70 | 70 | 2.6 | 17 | 432.0 | 370.3 | 1.09 | 1.90 | 2.68 | 78.90 |
| 17 | A-2 | 1 | 70 | 70 | 1.1 | 0.4 | 96.0 | 82.3 | 1.17 | 0.70 | 2.52 | 96.02 |
| 18 | A-2 | 1 | 70 | 70 | 2.3 | 4.6 | 203.0 | 174.0 | 1.41 | 2.20 | 3.92 | 81.00 |
| 19 | A-2 | 1 | 70 | 70 | 3.0 | 17 | 340.0 | 291.4 | 1.17 | 1.70 | 2.91 | 83.84 |

$C_2$ added = ethylene added in the reactor with 1-butene
$C_2$ feed = ethylene feed during the polymerization

The invention claimed is:

1. A 1-butene/ethylene copolymer having a content of ethylene derived units from 0.1% to 2.5% by weight in which an ethylene content in the polymer ($C_2$) and a melting point of the polymer (Tm) meet the following relation:

$$Tm = 4.0037 C_2^2 - 21.91 C_2 + 114.$$

2. A 1-butene/ethylene copolymer produced by a process comprising the step of contacting under polymerization conditions 1-butene and up to 20% by mol of ethylene and optionally at least one of propylene and an alpha olefin of formula $CH_2=CHZ$ wherein Z is a $C_3$-$C_{10}$ alkyl group, in the presence of a catalyst system obtained by contacting:

a) a racemic or racemic-like bridged metallocene compound of formula (I)

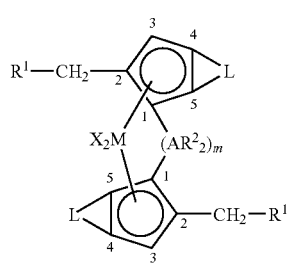

(I)

wherein $R^1$, same or different, is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

A, same or different, is a carbon atom, a germanium atom or a silicon atom; with the proviso that when m is 1, A is different from a carbon atom;

m is 1 or 2;

$R^2$, same or different, is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

M is a transition metal atom selected from those belonging to group 4 of the Periodic Table of the Elements (IUPAC version);

X, same or different, is a hydrogen atom, a halogen atom, or a R, OR, $OSO_2CF_3$, OCOR, SR, $NR_2$ or $PR_2$ group, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a $OR^{11}O$ group wherein $R^{11}$ is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

L, same or different, is a moiety of formula (IIa), (IIb), or (IIc)

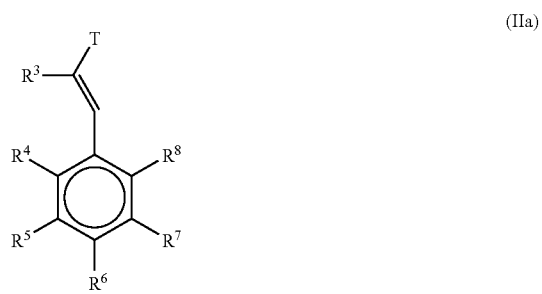

(IIa)

(IIb)

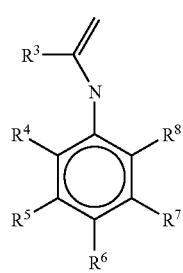

-continued (IIc)

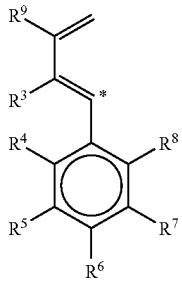

wherein in the moiety of formula (IIa), T bonds to the cyclopentadienyl group in position 5;

in the moiety of formula (IIb), N bonds to the cyclopentadienyl group in position 4;

in the moiety of formula (IIc), the carbon atom marked with the symbol * bonds to the cyclopentadienyl group in position 4;

T is an oxygen (O) atom or a sulphur (S) atom or a $CH_2$ group;

$R^3$ is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

$R^4$ is a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

$R^5$, $R^6$, $R^7$, $R^8$ and $R^9$ same or different are selected from the group consisting of hydrogen, linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, and $C_7$-$C_{20}$-arylalkyl radical, optionally containing heteroatoms belonging to groups 13-17 of the Periodic Table of the Elements or two adjacent groups can form together a saturated or unsaturated condensed 5 or 6 membered ring optionally containing heteroatoms belonging to groups 13-16 of the Periodic Table of the Elements;

b) an alumoxane or a compound that forms an alkylmetallocene cation; and c) optionally an organo aluminum compound;

the 1-butene/ethylene copolymer having a content of ethylene derived units from 0.1% to 5.0% by weight in which an ethylene content in the polymer ($C_2$) and a melting point of the polymer (Tm) meet the following relation:

$$Tm < -0.3283 C_2^3 + 4.7184 C_2^2 - 22.454 C_2 + 114.$$

3. A 1-butene/ethylene copolymer produced by a process comprising the step of contacting under polymerization conditions 1-butene and up to 20% by mol, of ethylene and at least one of propylene and an alpha olefin of formula $CH_2$=CHZ wherein Z is a $C_3$-$C_{10}$ alkyl group, in the presence of a catalyst system obtained by contacting:

a) a racemic or racemic-like bridged metallocene compound of formula (I)

(I)

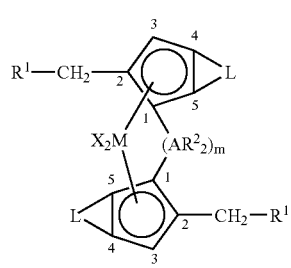

wherein $R^1$, same or different, is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

A, same or different, is a carbon atom, a germanium atom or a silicon atom; with the proviso that when m is 1, A is different from a carbon atom;

m is 1 or 2;

$R^2$, same or different, is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

M is a transition metal atom selected from those belonging to group 4 of the Periodic Table of the Elements (IUPAC version);

X, same or different, is a hydrogen atom, a halogen atom, or a R, OR, $OSO_2CF_3$, OCOR, SR, $NR_2$ or $PR_2$ group, wherein R is a linear or branched, saturated or unsaturated $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ arylalkyl radical, optionally containing heteroatoms belonging to groups 13-17 of the Periodic Table of the Elements; or two X can optionally form a substituted or unsubstituted butadienyl radical or a $OR^{11}O$ group wherein $R^{11}$ is a divalent radical selected from $C_1$-$C_{20}$ alkylidene, $C_6$-$C_{40}$ arylidene, $C_7$-$C_{40}$ alkylarylidene and $C_7$-$C_{40}$ arylalkylidene radicals;

L, same or different, is a moiety of formula (IIa), (IIb), or (IIc)

(IIa)

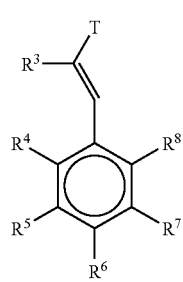

-continued

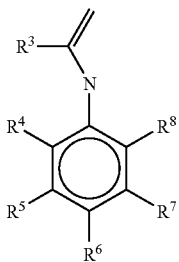
(IIb)

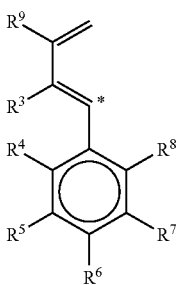
(IIc)

wherein
in the moiety of formula (IIa), T bonds to the cyclopentadienyl group in position 5;
in the moiety of formula (IIb), N bonds to the cyclopentadienyl group in position 4;
in the moiety of formula (IIc), the carbon atom marked with the symbol * bonds to the cyclopentadienyl group in position 4;

T is an oxygen (O) atom or a sulphur (S) atom or a $CH_2$ group;

$R^3$ is hydrogen, a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

$R^4$ is a linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, $C_7$-$C_{20}$-arylalkyl radical, optionally containing heteroatoms belonging to groups 13-17 of the Periodic Table of the Elements;

$R^5$, $R^6$, $R^7$, $R^8$ and $R^9$ same or different are selected from the group consisting of hydrogen, linear or branched saturated or unsaturated $C_1$-$C_{20}$-alkyl, $C_3$-$C_{20}$-cycloalkyl, $C_6$-$C_{20}$-aryl, $C_7$-$C_{20}$-alkylaryl, and $C_7$-$C_{20}$-arylalkyl radical, optionally containing heteroatoms belonging to groups 13-17 of the Periodic Table of the Elements or two adjacent groups can form together a saturated or unsaturated condensed 5 or 6 membered ring optionally containing heteroatoms belonging to groups 13-16 of the Periodic Table of the Elements;

b) an alumoxane or a compound that forms an alkylmetallocene cation; and c) optionally an organo aluminum compound;

the 1-butene/ethylene copolymer having a content of ethylene derived units from 0.1% to 2.5% by weight in which an ethylene content in the polymer ($C_2$) and a melting point of the polymer (Tm) meet the following relation:

$$Tm = 4.0037 C_2^2 - 21.91 C_2 + 114.$$

* * * * *